United States Patent
Gou

(10) Patent No.: US 11,697,208 B2
(45) Date of Patent: Jul. 11, 2023

(54) OPERATION MANAGEMENT METHOD AND DEVICE FOR ELEVATOR, ELEVATOR SYSTEM AND COMPUTER-READABLE STORAGE MEDIUM

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 282 days.

(21) Appl. No.: 17/094,514

(22) Filed: Nov. 10, 2020

(65) Prior Publication Data
US 2021/0283777 A1 Sep. 16, 2021

(30) Foreign Application Priority Data
Mar. 16, 2020 (CN) .......................... 202010181032.1

(51) Int. Cl.
*B25J 9/16* (2006.01)
*B25J 13/00* (2006.01)
(Continued)

(52) U.S. Cl.
CPC ........... *B25J 9/1679* (2013.01); *B25J 9/1653* (2013.01); *B25J 9/1697* (2013.01); *B25J 13/006* (2013.01);
(Continued)

(58) Field of Classification Search
CPC ...... B25J 9/1679; B25J 9/1653; B25J 9/1697; B25J 13/006; B25J 13/087; B25J 13/089;
(Continued)

(56) References Cited

U.S. PATENT DOCUMENTS 9,802,788 B2 * 10/2017 Miyajima ............. B66B 1/3461
2012/0152660 A1 * 6/2012 Fujihata .................. B66B 1/468
187/381
(Continued)

FOREIGN PATENT DOCUMENTS

CN 110540116 A * 12/2019
EP 3357852 A1 * 8/2018
(Continued)

OTHER PUBLICATIONS

European Search Report for Application No. 20213522.4; dated May 28, 2021; 7 Pages.

*Primary Examiner* — Adam R Mott
*Assistant Examiner* — Sagar Kc
(74) *Attorney, Agent, or Firm* — Cantor Colburn LLP

(57) ABSTRACT

A method for managing elevator operation, a device for managing elevator operation, an elevator system and a computer-readable storage medium. The method for managing elevator operation includes: establishing a communication connection with at least one of robots movably arranged in a preset area; receiving data information from the robot, the data information including elevator service information generated by the robot based on input information related to an elevator visitor; and controlling the operation of the elevator and/or the operation of at least another one of the robots according to the received data information.

11 Claims, 3 Drawing Sheets

(51) Int. Cl.
  *B25J 13/08*   (2006.01)
  *B66B 1/46*    (2006.01)
  *B66B 5/00*    (2006.01)

(52) U.S. Cl.
  CPC ........... *B25J 13/087* (2013.01); *B25J 13/089* (2013.01); *B66B 1/468* (2013.01); *B66B 5/0087* (2013.01)

(58) Field of Classification Search
  CPC . B66B 1/468; B66B 5/0087; B66B 2201/104; B66B 1/2408; B66B 1/06; B66B 1/3423; B66B 1/3446; B66B 5/0012; B66B 5/0031; B66B 5/02
  See application file for complete search history.

(56)          References Cited

U.S. PATENT DOCUMENTS

2013/0110281 A1*  5/2013  Jones ................... G05D 1/0214
                                                      700/228
2016/0368734 A1* 12/2016  Zhao .................... B66B 29/005
2020/0061839 A1*  2/2020  Deyle .................. G06Q 10/087

FOREIGN PATENT DOCUMENTS

EP         3357852 A1       8/2018
EP         3450371 A1 *     3/2019    .............. B66B 1/28
EP         3450371 A1       3/2019
JP       2006198730 A  *    8/2006
JP       2006198730 A       8/2006
JP       2018030655 A       3/2018
JP       2019052027 A  *    4/2019    .............. B66B 1/06
WO    WO-2019171917 A1 *    9/2019    ............ B25J 11/008

* cited by examiner

OPERATION MANAGEMENT METHOD AND DEVICE FOR ELEVATOR, ELEVATOR SYSTEM AND COMPUTER-READABLE STORAGE MEDIUM

FOREIGN PRIORITY

This application claims priority to Chinese Patent Application No. 202010181032.1, filed Mar. 16, 2020, and all the benefits accruing therefrom under 35 U.S.C. § 119, the contents of which in its entirety are herein incorporated by reference.

FIELD OF THE INVENTION

The disclosure relates to the technical field of elevators and, more particularly, to a method for managing elevator operation, a device for managing elevator operation, an elevator system and a computer-readable storage medium.

BACKGROUND OF THE INVENTION

Due to technological progress and social development, more various types of autonomous intelligent facilities such as intelligent office buildings, large commercial buildings, public transportation hubs and the like have emerged, which usually use their own elevator facilities to achieve transportation of people, materials, etc., thereby bringing great convenience to people's work, life and travel.

However, as people's daily activities are becoming more frequent and complex, and personalized needs are gradually increasing, when these autonomous intelligent facilities use existing elevators to provide them with corresponding services, there will be deficiencies and shortcomings in terms of safety, intelligentization, convenience, user experience and cost of use for example.

SUMMARY OF THE INVENTION

In view of the foregoing, the disclosure provides a method for managing elevator operation, a device for managing elevator operation, an elevator system and a computer-readable storage medium, thereby solving or at least alleviating one or more of the above-mentioned problems and other problems existing in the related art.

Firstly, according to a first aspect of the disclosure, a method for managing elevator operation is provided, which includes the steps of: establishing a communication connection with at least one of robots movably arranged in a preset area; receiving data information from the robot, the data information comprising elevator service information generated by the robot based on input information related to an elevator visitor; and controlling the operation of the elevator and/or the operation of at least another one of the robots according to the received data information.

In the method for managing elevator operation according to the disclosure, optionally, the robots includes at least a first robot and a second robot arranged at different locations in the preset area respectively, and the first robot acquires the input information from the elevator visitor to generate the elevator service information, the elevator service information including identity feature, current location, and elevator-calling floor of the elevator visitor.

Optionally, the method for managing elevator operation according to the disclosure further includes at least one of the following steps: dispatching an elevator car to arrive at the floor where the current location is on and run to the elevator-calling floor after the elevator visitor is loaded, according to the current location and the elevator-calling floor in the elevator service information; notifying the second robot located on or closest to the elevator-calling floor to arrive at an elevator door on the elevator-calling floor according to the elevator-calling floor in the elevator service information, for providing the elevator visitor, after arriving at the elevator-calling floor, with service; judging whether it is necessary to inform the second robot to accompany the elevator visitor to take the elevator according to the identity feature in the elevator service information: if yes, informing the second robot to go to the elevator door at the current location to accompany the elevator visitor to take the elevator, and making no response to the elevator operation performed by the elevator visitor before the second robot arrives at the elevator door; authenticating the identity of the elevator visitor according to the identity feature in the elevator service information when the elevator visitor is taking the elevator; and performing a verification based on the identity feature in the elevator service information when the elevator visitor changes the elevator-calling floor thereof, and updating elevator-calling registration after the verification on the changed elevator-calling floor is passed.

Optionally, the method for managing elevator operation according to the disclosure further includes the following steps: receiving feedback information from the notified or informed second robot; and when it is determined that the notified or informed second robot cannot arrive at the elevator door according to the feedback information, notifying at least another second robot to arrive at the elevator door.

In the method for managing elevator operation according to the disclosure, optionally, the first robot is arranged in a lobby of a building where the elevator is located, and the second robot is arranged on one or more floors of the building.

In the method for managing elevator operation according to the disclosure, optionally, the preset area includes a target location, and the method for managing elevator operation further includes the step of: judging whether there is currently the robot at the target location; if not, notifying at least one of the robots to arrive at the target location.

Optionally, the method for managing elevator operation according to the disclosure further includes the step of: notifying at least one of the robots to perform at least one of the following operations: performing elevator safety inspection, identifying dangers or malfunctions in the preset area, warning the dangers or malfunctions in the preset area, and detecting crowd flow in the preset area.

In the method for managing elevator operation according to the disclosure, optionally, the robot performs the operations, by means of one or more sensors including one or more of an image sensor, a video sensor, an acoustic sensor, an infrared sensor, a depth sensor, a temperature sensor, a smoke sensor, and a gunshot sensor.

In the method for managing elevator operation according to the disclosure, optionally, the preset area includes a lobby of a building where the elevator is located, an elevator door, and a target location of a preset floor.

Further, according to a second aspect of the disclosure, a device for managing elevator operation is provided, which includes a processor and a memory for storing instructions, wherein when the instructions are executed, the processor implements any one of the methods for managing elevator operation as described above.

In addition, according to a third aspect of the disclosure, an elevator system is further provided, which includes: an elevator having at least one elevator car; and a device for managing elevator operation, which is communicatively connected with the elevator and at least one robot movably arranged in a preset area, and which includes a processor and a memory for storing instructions, wherein when the instructions are executed, the processor implements any one of the methods for managing elevator operation as described above.

Additionally, according to a fourth aspect of the disclosure, a computer-readable storage medium is further provided, which is configured to store instructions, wherein when the instructions are executed, any one of the above-described methods for managing elevator operation is implemented.

From the following detailed description in conjunction with the accompanying drawings, the principles, characteristics, features, advantages and the like of various technical solutions according to the disclosure will be clearly understood. For example, by applying robot technology in the technical solutions of the disclosure, the service level of the existing elevator systems can be significantly improved, so as to meet people's requirements more safely, reliably, efficiently and intelligently, and improve their comfort experiences in taking the elevator. The application of the disclosure can make up for the shortcomings of the existing elevator systems in terms of meeting higher intelligentization for example, and can be effectively combined with the elevator systems to reduce use cost. Therefore, the invention has outstanding practicality.

BRIEF DESCRIPTION OF THE DRAWINGS

The technical solutions of the disclosure will be further described in detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION OF THE EMBODIMENT(S) OF THE INVENTION

First, it is noted that the structural components, steps, characteristics, advantages and the like of the method for managing elevator operation, the device for managing elevator operation, the elevator system, and the computer-readable storage medium according to the disclosure will be described below by way of example. However, all the descriptions are not intended to limit the disclosure in any way. Herein, the technical term "robot" refers to all artificial machine devices capable of automatically performing tasks, which may be used to replace or assist people in various types of affairs, e.g., providing many types of elevator-related services such as area guidance, accompanying taking the elevator, routing inspections, hazard identification and warning, and crowd flow data collection and analysis, so as to better assist the operation of the elevator system.

In addition, for any single technical feature described or implied in the embodiments mentioned herein, or any single technical feature depicted or implied in the accompanying drawings, the disclosure still allows for any combination or deletion of these technical features (or equivalents thereof) without any technical obstacles, so these further embodiments according to the disclosure should also be considered to be within the scope of the disclosure. Additionally, in order to simplify the drawings, identical or similar parts and features may be marked in only one or more places in the same drawing.

Figure 1:
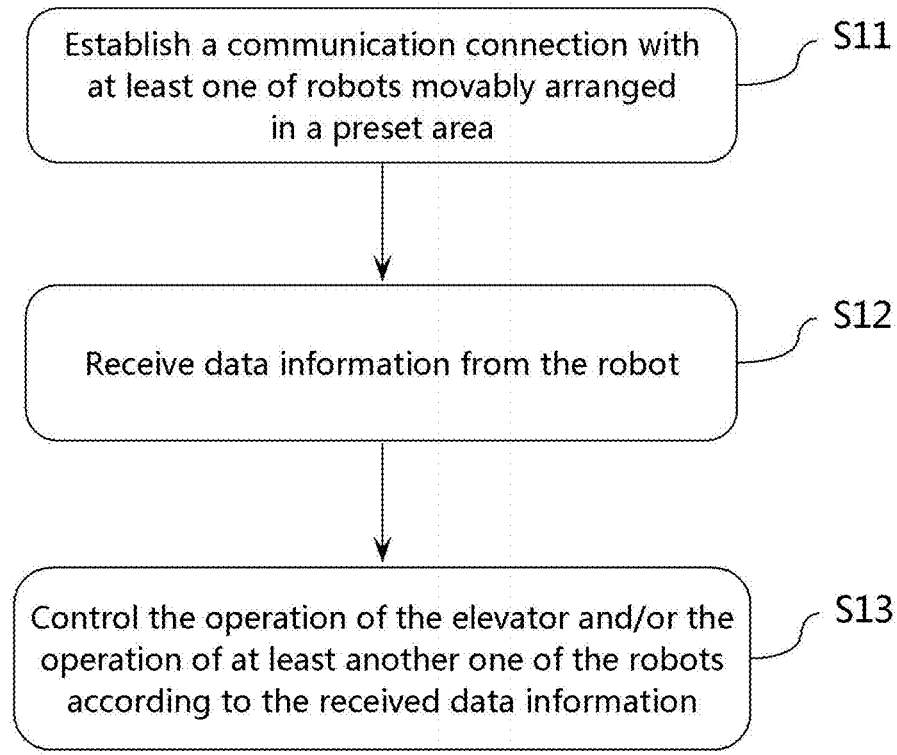
FIG. 1 is a schematic flowchart of an embodiment of a method for managing elevator operation according to the disclosure.
Figure 2:
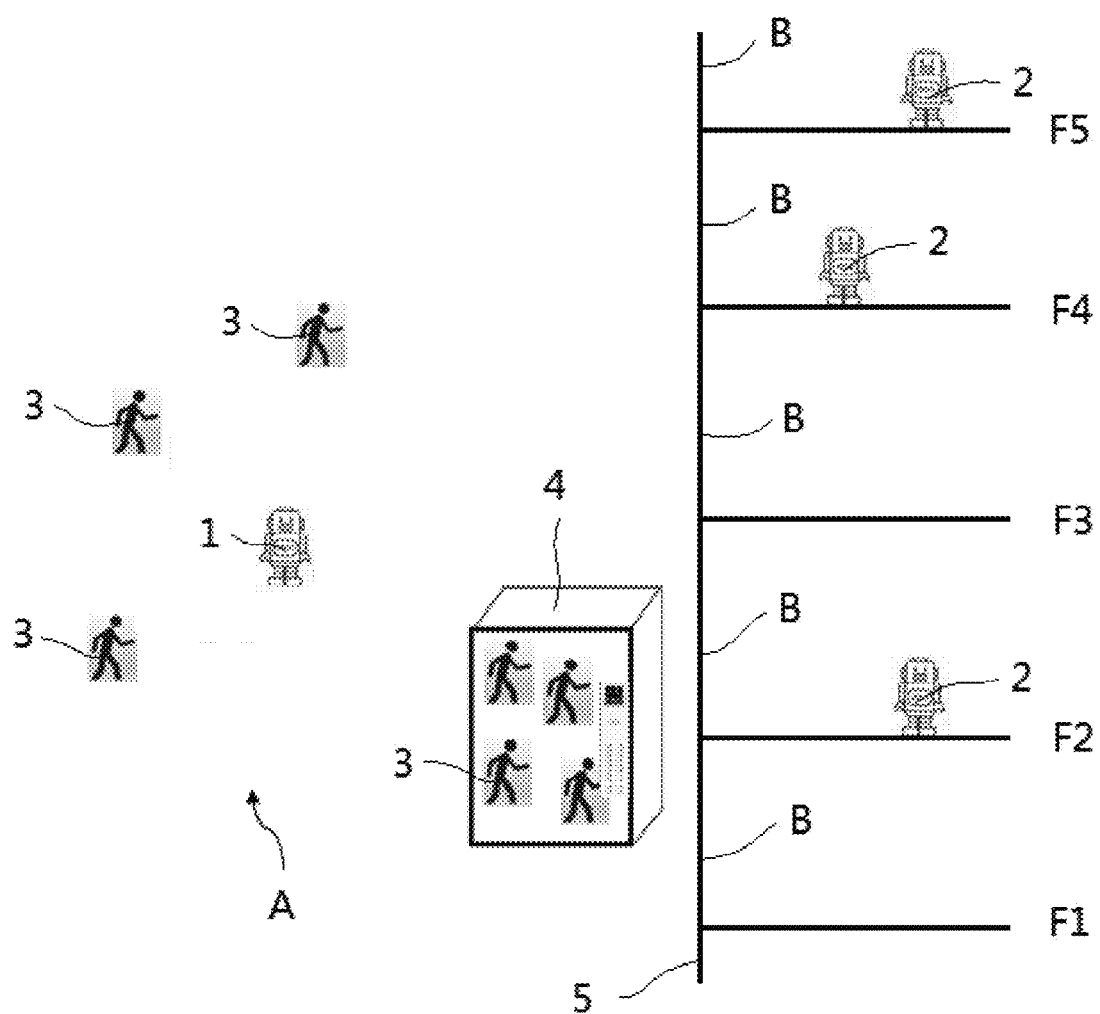
FIG. 2 is a schematic diagram of an application scene of an embodiment of a method for managing elevator operation according to the disclosure.
Figure 3:
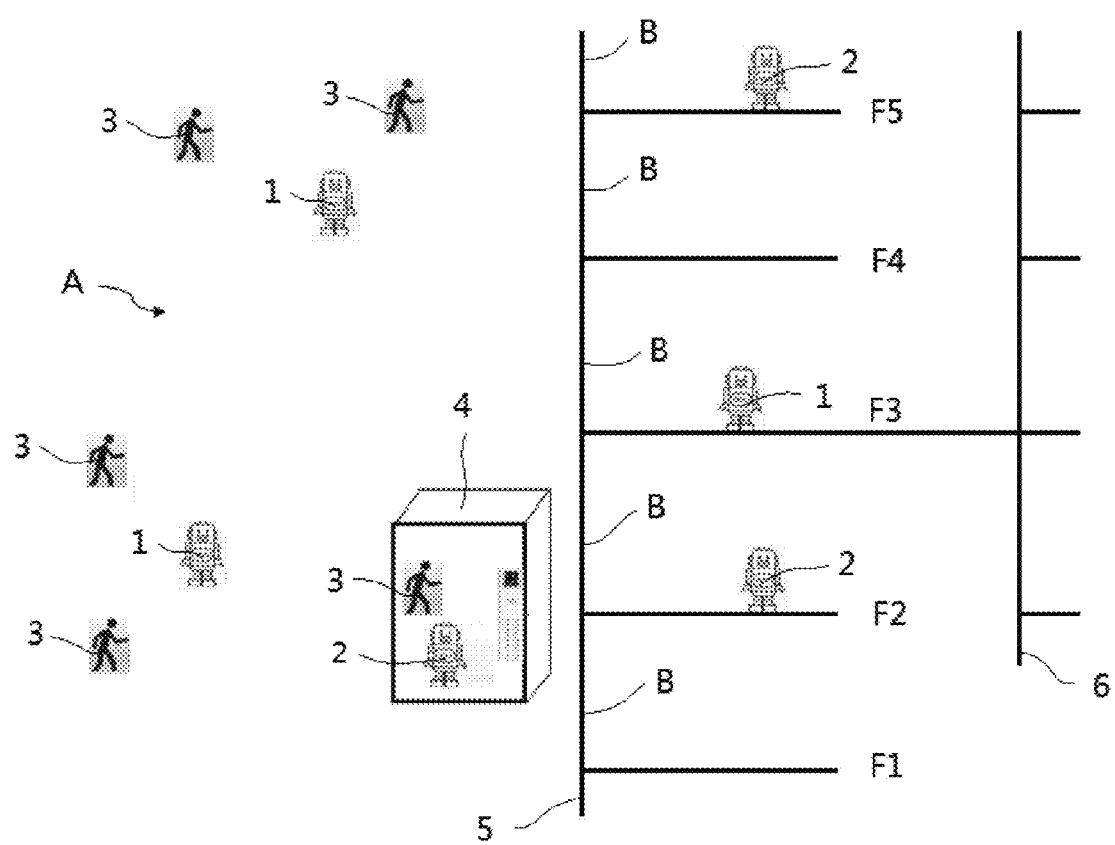
FIG. 3 is a schematic diagram of an application scene of another embodiment of a method for managing elevator operation according to the disclosure.

A general processing flow of an embodiment of a method for managing elevator operation according to the disclosure and specific application scenes using two different embodiments of the method according to the disclosure are shown in FIGS. 1, 2 and 3 respectively. In the following, the disclosure will be described in detail with reference to the examples shown in the drawings.

Referring to FIG. 1, in this embodiment shown in the figure, the method for managing elevator operation may include the following steps: first, in step S11, a communication connection may be established between a robot and a module, device, or system (such as an elevator controller, etc.) configured to control the operation of the elevator, so that data information can be transferred. According to the needs of specific applications, one or more robots may be flexibly arranged in a preset area; for example, they can be movably arranged in a lobby of a building where the elevator is located, an elevator door, or a target location on certain one or more floors (which may for example involve danger or malfunction warning, conference guidance, equipment safety, etc.), so that the robots can move to required locations according to application requirements to provide many possible types of services. The numbers, working models, sizes, functional uses, power supply modes, layout areas and the like of these robots may be selected, set, or adjusted according to actual needs, and will be further described later in conjunction with the embodiments shown in FIGS. 2 and 3.

It should be understood that in specific applications, the above-mentioned communication connection with the robot is allowed to take any feasible form, for example, a wireless communication method, a wired communication method, or a combination thereof. For example, wireless communication methods such as Bluetooth, Wi-Fi, NB-IOT, ZigBee, 4G, 5G and the like may be used individually or in any combination. Although generally speaking, the communication connection between the robot and the module, device or system configured to control the operation of the elevator will be a two-way interaction (that is, it allows for both sending and receiving operations), but in some applications, it may be only one-way transmission (that is, it allows for only sending operation or receiving operation). For example, only receiving data information from the robot is allowed, and sending data information to the robot is not allowed.

In addition, the module, device or system configured to control the operation of the elevator can be arranged locally (for example, in the building where the elevator is installed) and/or in the cloud, which can be set and selected correspondingly according to the actual requirements of different applications, etc.

With continued reference to FIG. 1, in step S12, by means of the above communication connection, data information from the robot that is movably arranged within the preset area can be received. According to the specific application situation, such data information may include any possible content to be provided to the module, device or system configured to control the operation of the elevator for example for use. For example, the above data information may include, but is not limited to, elevator service information (such as identity feature(s) of the elevator visitor, current location, elevator-calling floor, etc.) generated by the robot based on the input information related to the elevator visitor and obtained by the robot. Regarding the acquisition of the above input information, the disclosure allows multiple means or ways to be implemented in order to be able to fully meet different application requirements. For example, it can be provided by the elevator visitor and on-site staff during the interaction with the robot, such as by manually operating a human-machine interface disposed on the robot, conducting voice dialogue with the robot, and performing data collection and analysis processing (such as in the form of image/video) on a target object such as the elevator visitor by the robot. For another example, the elevator-calling floor may be directly provided by the elevator visitor, but when the elevator visitor only knows part of the information of the desired destination (for example, only the company name can be provided) and does not know the exact floor information, the receptionist robot can obtain the corresponding elevator-calling floor through its own processing (such as querying a local or remote database, etc.).

Then, in step S13, the operation of the elevator and/or one or more other robots can be controlled according to the received data information. In practical applications, the above controls may be implemented by, for example, the module, device or system configured to control the operation of the elevator. For example, corresponding control instructions can be formed after the above data information is judged and analyzed; then, the control instructions are sent to one or more specific robots for response via the communication connection discussed above, so as to provide the required elevator service operations, etc. The two different examples shown in FIG. 2 and FIG. 3 will be described in detail below to facilitate a better understanding of the solutions of the disclosure.

FIG. 2 schematically shows an application scene of an embodiment of a method for managing elevator operation according to the disclosure.

Specifically, in this embodiment, a robot 1 and several robots 2 are shown, which are arranged at different locations in a preset area respectively. For example, the above robot 1 may be arranged in a lobby A of a building 5, and the robots 2 may be exemplarily arranged on floors F2, F4, and F5 of the building 5 as needed. Of course, the above robots 2 may optionally take the elevator to other floors, such as floors F1 and F3 shown in FIG. 2 where no robots are directly arranged.

It should be noted that the "preset area" herein may be any desired target area inside the building and associated with the elevator, but it may also be the surrounding area of the building. For example, the disclosure allows one or more robots to be additionally arranged in the adjacent area of the building to provide corresponding services. This is very advantageous when for example holding various exhibitions, parties, large-scale events and the like in the building and when a large passenger flow in the elevator may therefore be caused; in particular, data information can be provided to the elevator system timely and quickly, the overall intelligent service level, safety and reliability of the system can be improved, and the user experience in taking the elevator can be improved.

As shown in FIG. 2, data information such as elevator service information may be generated by the robot 1 according to the conditions of the elevator visitor 3, so as to be provided to, for example, the module, device, or system configured to control the operation of the elevator (or any other suitable modules, devices, or systems) to implement purposes such as management and control of the elevator.

As an example, in an optional situation, the elevator car 4 can be directly dispatched to the current floor of the elevator visitor 3 according to the current location and elevator-calling floor in the received elevator service information related to the elevator visitor 3; then, after the elevator visitor 3 is loaded into the elevator car 4, the elevator car directly runs to the elevator-calling floor, so that a fairly intelligent elevator operation service can be achieved.

In addition, in some embodiments, based on the elevator-calling floor in the received elevator service information related to the elevator visitor 3, the target floor that the elevator visitor 3 wishes to go to for this time can be known, therefore the robot 2 on the elevator-calling floor can be notified to arrive at an elevator door B on the elevator-calling floor, so that after the elevator visitor 3 arrives at the elevator-calling floor, the robot 2 can provide the elevator visitor 3 with any possible services such as guidance and consultation. Of course, if it is found that there is currently no robot 2 available for service on the elevator-calling floor (for example, no robot 2 has been placed there before, or the robot 2 has been placed there but it is not currently at the post, etc.), then the robot 2 on another floor (such as the closest floor to the above-mentioned elevator-calling floor) can be notified to go to the elevator door B on the elevator-calling floor so as to be able to provide services to the elevator visitor 3 arriving there. As an optional situation, it may be considered to directly implement the above notification operations on the other robots 2 through the robot 1.

In addition, in some embodiments, the elevator visitor 3 may also be authenticated for identity according to the identity feature(s) in the above elevator service information while the elevator visitor 3 is taking the elevator, for example to judge and analyze whether the elevator visitor 3 has a permission to access the requested elevator-calling floor, etc., which may be implemented, for example, by the module, device or system configured to control the operation of the elevator by means of database information already stored locally and/or remotely. If the identity authentication fails, any suitable subsequent measures can be taken, such as notifying the security personnel to go to the site for processing, sending a security warning, etc.

It should be understood that the "identity feature" herein may include any separate or combined information used to distinguish the specific identity of the elevator visitor 3, such as a document number (such as an ID number, passport number, etc.), facial image, voice sound waves, age, gender, body shape, sports characteristics, job occupation, etc., which may not only be provided directly by the elevator visitor 3 during the interaction with the robot, but also may be obtained by the robot or the like through voice, image acquisition, etc.

As an optional exemplary description, when the elevator visitor 3 changes the original elevator-calling floor due to various reasons such as misoperation, the module, device or system configured to control the operation of the elevator may for example be used to verify this change operation according to such identity feature(s) in the elevator service information; the calling registration is updated if the verification is passed, otherwise this change operation can be rejected, and the rejection result may be optionally informed to the elevator visitor 3 by, for example, the robot or other devices located in the building (such as a human-computer interaction screen, etc.).

In addition, in some application occasions, one or more target locations in the preset area may also be monitored by, for example, camera monitoring, etc. When it is judged that there is no robot currently at the target location, one or more robots are notified to go to the target location, so as to be able to ensure that there is always a robot in need to provide services. Generally speaking, the above-mentioned target location is often a relatively important or critical location, such as the lobby A of the building, the elevator doors B on some (or all) floors, an area under facility maintenance or in malfunction status, an area in dangerous situation, etc.

Reference is made to FIG. 3, which schematically shows an application scene of an embodiment of a method for managing elevator operation according to the disclosure. Unless otherwise specified, for the components and working modes in the embodiment shown in FIG. 3, reference may be respectively made to the corresponding contents in the embodiment shown in FIG. 2 described above.

As shown in FIG. 3, it is exemplarily shown that two robots 1 are arranged at the lobby A of a building at the same time, and they can be used to interact with the elevator visitor 3. For example, when the building has a large spatial range, the above two robots 1 may be relatively staggered, for example, to make them relatively closer to different entrances and exits of the lobby, so as to be able to better cope with the environmental space characteristics in this situation. As mentioned above, the method of the disclosure fully allows a flexible selection, setting and adjustment of the specific arrangement location, the number and the like of the robot 1 according to the application requirements. For example, the robots 1 may also be disposed on one or more certain floors in the building, so that services can be provided to the elevator visitor 3 when the elevator visitor 3 is going from such a floor to another building 6 in communication with the current building 5, which is also shown schematically in FIG. 3.

In some embodiments, when it is judged that the robot 2 needs to be dispatched to accompany the elevator visitor 3 (which, for example, indicates that the elevator visitor is disabled, old, young, or sick, etc.) to take the elevator together according to for example the identity feature(s) in the elevator service information or according to other means (such as a voluntary request from the elevator visitor, etc.), one or more robots 2 can be informed by the robot 1 or the module, device or system configured to control the operation of the elevator to go to the elevator door B at the current location, so as to accompany the elevator visitor 3 to take the elevator together; before the robot 2 arrives at the elevator door B, the elevator will not respond to any elevator operation performed by the elevator visitor 3, which can enhance the overall safety performance of the system and provide the above special elevator visitors with more intelligent and humanized elevator service so that their satisfaction and comfort are improved.

In addition, in the embodiment of the method according to the disclosure, the robot may be set to, when receiving a notification task such as going to a certain place, first judge whether the task can be performed. If it is judged that the task cannot be performed, then the robot sends corresponding feedback information to inform, for example, the module, device or system configured to control the operation of the elevator, or other robots, etc., and the latter notify other robots in time to complete the above task.

It should be noted that the robot in the method of the disclosure can also be applied to for example any possible various types of affaires associated with elevator service.

By way of example only, one or more robots may be notified to perform such operations according to the application requirements. The operations may include, but are not limited to, for example, performing elevator safety inspections, identifying hazards (such as public hazards) or malfunctions in the preset area, warning dangers in the preset area (such as fights, gunshots, poison gas leakages, biochemical attacks, etc.) or malfunctions (such as dispatching the robot to go to or approach the current malfunction maintenance station for warning), detecting a crowd flow in the preset area, etc., so as to assist in the safe operation and management of the elevator, and reduce or even eliminate undesired safety risks and possible personal, equipment, or property damage caused thereby, thus effectively improving the overall safety of the elevator system.

In practical applications, one or more sensors may be used to facilitate the robot to perform the above or other operations. For example, such sensors may be, for example, one or more of an image sensor, a video sensor, an acoustic sensor, an infrared sensor, a depth sensor, a temperature sensor, a smoke sensor, and a gunshot sensor, and the arrangement locations, numbers, and types thereof may be set flexibly in specific applications. For example, the disclosure allows one or more sensors to be installed directly on the robot, or at the lobby, floor, roof or side wall of the elevator car 4, or any other suitable location of the building, either individually or in combination, in order to better detect and obtain the desired data information.

In addition, as an aspect significantly superior to the related art, the disclosure also provides a device for managing elevator operation, which may include a processor and a memory in which instructions are stored. When these instructions are executed, the above-mentioned processor in the device for managing elevator operation implements the method for managing elevator operation designed and provided according to the disclosure, so that the obvious technical advantages of the solutions of the disclosure as described above over the related art can be achieved.

For example, as an optional situation, the device for managing elevator operation according to the disclosure can be implemented as an elevator controller for controlling the operation of the elevator; for example, it can be integrated into the elevator controller of an existing elevator, which can effectively improve the intelligence level of these existing elevators.

As another example, in some applications, the device for managing elevator operation can be implemented as, for example, a control device that is independently disposed external to the control system of the elevator itself (such as the elevator controller, etc.), an APP installed in a terminal (such as a smart phone, a handheld tablet computer, etc.), and any possible suitable forms, so that a communicative interaction is realized between the robot and the control system of the elevator itself through the device for managing elevator operation, thereby achieving the aforementioned method for managing elevator operation according to the disclosure.

In addition, it can be understood that the processor and memory in the device for managing elevator operation according to the disclosure can be implemented using any suitable components, chips, or modules; for example, such memory can be used to store programs instructions, and the corresponding steps contained in the above program instructions can be realized by running such processor.

According to the design concept of the disclosure, an elevator system is also provided, which may include an elevator and the device for managing elevator operation designed and provided according to the disclosure. A communication connection may be established between the elevator and one or more robots movably disposed in a preset area through the device for managing elevator operation to implement the method for managing elevator operation according to the disclosure, so that the intelligent level of the elevator system can be improved. The elevator can be any elevator with a lifting function, such as many existing types elevator products. By adopting the elevator system of the disclosure, advanced robot technology can be applied at a lower cost to improve the intelligence level of the elevator system, thereby effectively solving the deficiencies and shortcomings in the related art mentioned above.

In addition, the disclosure also provides a computer-readable storage medium for storing instructions which, when executed, can implement the method for managing elevator operation according to the disclosure. The above-mentioned computer-readable storage medium may be any type of component, module or device capable of storing instructions, which may include, but is not limited to, for example, read only memory (ROM), random access memory (RAM), erasable programmable read only memory (EPROM), etc.

The method for managing elevator operation, the device for managing elevator operation, the elevator system and the computer-readable storage medium according to the disclosure have been elaborated above in detail by way of example only. These examples are merely used to illustrate the principles and embodiments of the disclosure, rather than limiting the disclosure. Various modifications and improvements can be made by those skilled in the art without departing from the spirit and scope of the disclosure. Therefore, all equivalent technical solutions should fall within the scope of the disclosure and be defined by the claims of the disclosure.

What is claimed is:

1. A method for managing elevator operation, comprising the steps of:
   establishing a communication connection with at least one of robots movably arranged in a preset area;
   receiving data information from the robot, the data information comprising elevator service information generated by the robot based on input information related to an elevator visitor; and
   controlling the operation of the elevator and the operation of at least another one of the robots according to the received data information;
   wherein the robots comprises at least a first robot and a second robot arranged at different locations in the preset area respectively, and the first robot acquires the input information from the elevator visitor to generate the elevator service information, the elevator service information comprising identity feature, current location, and elevator-calling floor of the elevator visitor;
   the method further comprising:
   notifying the second robot located on or closest to the elevator-calling floor to arrive at an elevator door on the elevator-calling floor according to the elevator-calling floor in the elevator service information, for providing the elevator visitor, after arriving at the elevator-calling floor, with service; and
   judging whether it is necessary to inform the second robot to accompany the elevator visitor to take the elevator according to the identity feature in the elevator service information: if yes, informing the second robot to go to the elevator door at the current location to accompany the elevator visitor to take the elevator, and making no response to the elevator operation performed by the elevator visitor before the second robot arrives at the elevator door.

2. The method for managing elevator operation according to claim 1, further comprising at least one of the following steps:
   dispatching an elevator car to arrive at the floor where the current location is on and run to the elevator-calling floor after the elevator visitor is loaded, according to the current location and the elevator-calling floor in the elevator service information;
   authenticating the identity of the elevator visitor according to the identity feature in the elevator service information when the elevator visitor is taking the elevator; and
   performing a verification based on the identity feature in the elevator service information when the elevator visitor changes the elevator-calling floor thereof, and updating elevator-calling registration after the verification on the changed elevator-calling floor is passed.

3. The method for managing elevator operation according to claim 2, further comprising the following steps:
   receiving feedback information from the notified or informed second robot; and
   when it is determined that the notified or informed second robot cannot arrive at the elevator door according to the feedback information, notifying at least another second robot to arrive at the elevator door.

4. The method for managing elevator operation according to claim 1, wherein the first robot is arranged in a lobby of a building where the elevator is located, and the second robot is arranged on one or more floors of the building.

5. The method for managing elevator operation according to claim 1, wherein the preset area comprises a target location, and the method for managing elevator operation further comprises the step of:
   judging whether there is currently the robot at the target location: if not, notifying at least one of the robots to arrive at the target location.

6. The method for managing elevator operation according to claim 1, further comprising the step of:
   notifying at least one of the robots to perform at least one of the following operations: performing elevator safety inspection, identifying dangers or malfunctions in the preset area, warning the dangers or malfunctions in the preset area, and detecting a crowd flow in the preset area.

7. The method for managing elevator operation according to claim 6, wherein the robot performs the operations, by means of one or more sensors comprising one or more of an image sensor, a video sensor, an acoustic sensor, an infrared sensor, a depth sensor, a temperature sensor, a smoke sensor, and a gunshot sensor.

8. The method for managing elevator operation according to claim 1, wherein the preset area comprises a lobby of a building where the elevator is located, an elevator door, and a target location of a preset floor.

9. A device for managing elevator operation, comprising a processor and a memory for storing instructions, wherein when the instructions are executed, the processor implements the method for managing elevator operation according to claim 1.

10. An elevator system, comprising:
an elevator; and
a device for managing elevator operation, which is communicatively connected with the elevator and at least one robot movably arranged in a preset area, and comprises a processor and a memory for storing instructions, wherein when the instructions are executed, the processor implements the method for managing elevator operation according to claim 1.

11. A non-transitory computer-readable storage medium, which is configured to store instructions, wherein when the instructions are executed, the method for managing elevator operation according to claim 1 is implemented.

\* \* \* \* \*